Patented Aug. 14, 1923.

1,464,944

UNITED STATES PATENT OFFICE.

HERMAN KRUSE, OF JERSEY CITY, AND WILLIAM C. KRUSE, OF UNION, NEW JERSEY.

INK.

No Drawing.   Application filed October 23, 1919.   Serial No. 332,805.

*To all whom it may concern:*

Be it known that we, HERMAN KRUSE and WILLIAM C. KRUSE, citizens of the United States, residing at Jersey City, and town of Union, in the county of Hudson and State of New Jersey, have invented certain new and useful Improvements in Inks, of which the following is a specification, reference being had therein to the accompanying drawing.

Our invention relates to improvements in inks and has particular reference to ink adapted for use upon the stencils of a duplicating or mimeographing machine. In an ink of this character it is important that it should retain a proper consistency while in use and dry equally after being applied without smudging or spreading. In most inks of this character it is necessary to shake them thoroughly before using because of the settling of certain of the ingredients and in most of the inks used the copy does not present clean cut sharp outlines of the characters printed, whereas these objections are overcome with an ink prepared substantially as hereinafter described.

For the purpose of illustration we will describe an ink adapted to print in black, although of course it will be readily understood that practically any other color of ink can be prepared in accordance herewith.

According to a preferred embodiment of our invention we employ a suitable vehicle such as sulfonated or Turkey red oil which is preferably neutralized as described in our previous Letters Patent No. 1309292, and a color base such as carbon with which is combined a suitable consistency element which will maintain the proper consistency of the ink. For this purpose it has been customary to employ glycerin, but we have found that a much better ink can be produced by the use of a saponified rosin varnish which may be made up of water, soda, rosin, and oil, substantially as follows: ten pounds of water, one pound and a half of sal soda (sodium carbonate), fifteen pounds of gum rosin, thirty pounds of kerosene oil, and sixty pounds of paraffine oil (No. 903, Swan & Finch). These ingredients may be heated in a steam jacketed kettle until all the water is evaporated. A varnish thus prepared (saponified) it will be found will readily mix with the water of the Turkey red oil so that there will be no separating out of the water, and the proper consistency of the ink can be readily established and maintained.

A very good quality of ink can be produced with about the following proportions: About seventy parts Turkey red or any sulfonated oil (60% neutral and 40% water), about thirty parts of saponified rosin varnish substantially as above specified, about six parts carbon black and about two parts malori blue. In the preparation of the ink it has been found desirable to grind about fifteen parts of the Turkey red oil and about fifteen parts of the saponified rosin varnish with all of the black and the blue and add the balance of the ingredients. The saponified rosin varnish will not be hydroscopic like glycerin and therefore the ink is always available for immediate use in the proper condition or consistency whether used in hot or cold climates whereas it is well known that gelatinous stencils are affected by the glycerin and must be prepared especially for different climates.

Of course it will be understood that animal and vegetable oils may be substituted for the mineral oils and in parts the proportions and methods of compounding or mixing may be varied without departing from the spirit of the invention as claimed.

We claim:

1. In a stencil ink containing a vehicle, a color base and a saponified resinous element in combination therewith.

2. In stencil ink, neutralized Turkey red oil, carbon black, and a consistency element made up from about ten pounds of water, one pound and a half sodium carbonate, fifteen pounds of gum rosin, thirty pounds of kerosene oil, and sixty pounds of paraffine oil.

3. In an ink such as specified in claim 3, about seventy parts of the Turkey red oil, and about six parts of ground carbon to about thirty parts in all of the consistency element.

4. In stencil ink, a neutralized Turkey-red oil, carbon black, and a consistency element comprising gum rosin, kerosene oil, and paraffine oil.

5. In stencil ink, Turkey red oil, a color base, and a thickened mineral oil.

In testimony whereof we hereunto affix our signatures in the presence of two witnesses.

HERMAN KRUSE.
WILLIAM C. KRUSE.

Witnesses:
ANNA F. DUFFY,
DAVID H. DOUGLASS.